Patented Feb. 4, 1941

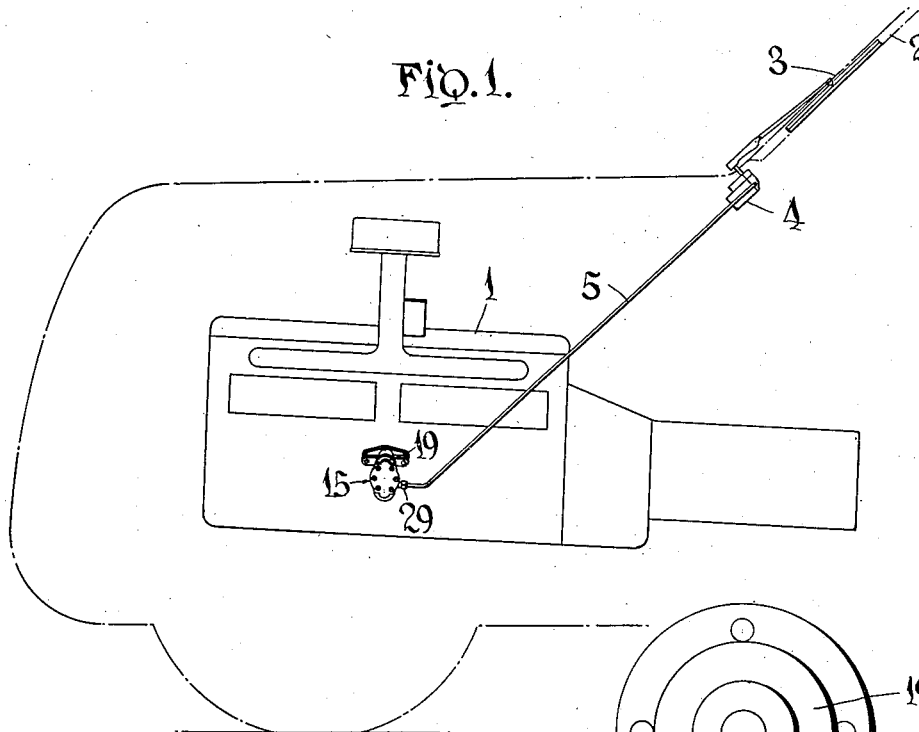
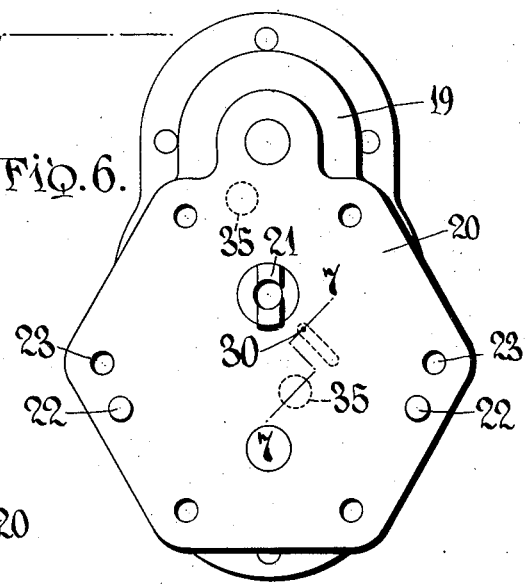
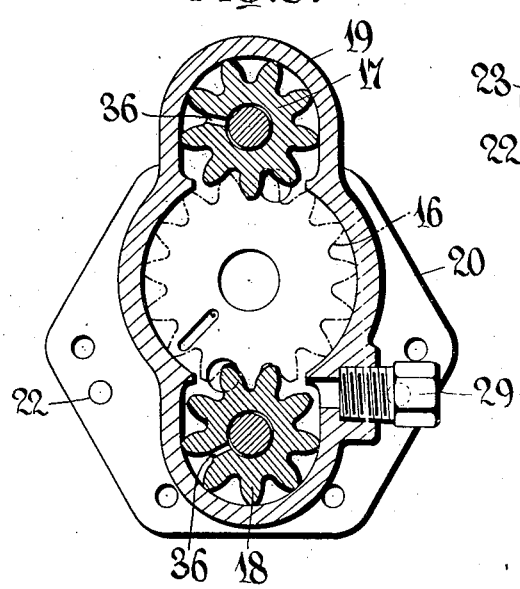
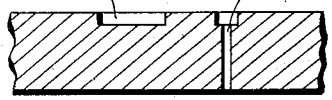

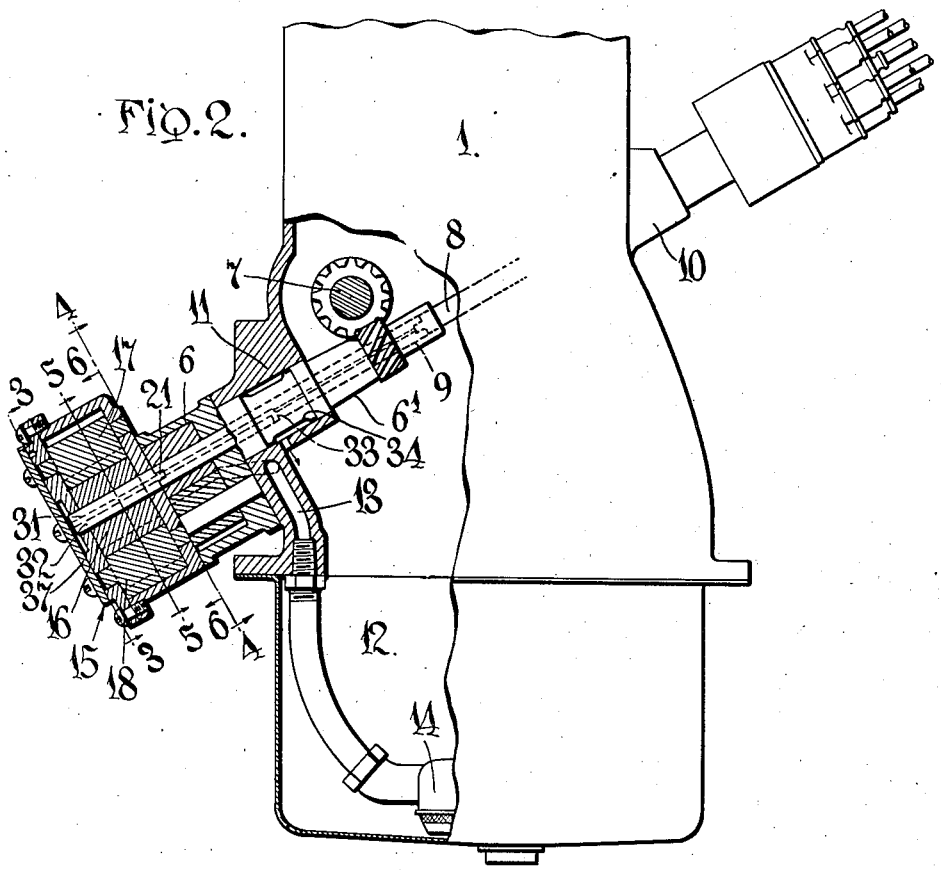

2,230,594

UNITED STATES PATENT OFFICE 2,230,594

PUMPING SYSTEM

Erwin C. Horton, Hamburg, N. Y., assignor to Trico Products Corporation, Buffalo, N. Y.

Application September 5, 1936, Serial No. 99,678

4 Claims. (Cl. 230—141)

This invention relates to a windshield cleaner or other accessory system for motor vehicles and primarily to a low pressure or suction pump especially adapted for maintaining an adequate supply of operating pressure for the accessory during operation of the motor vehicle power plant.

It has heretofore been proposed to use a two gear suction pump in the power plant of a motor vehicle to operate suction actuated accessories, but because of the small gears employed it has been necessary to operate them at an impractically high speed which would soon impair their usefulness. When operating at a lower speed the available pressure is insufficient to practically actuate the accessories.

The present invention has for its object to provide a compound pump structure wherein the intermeshing gears provide a sufficient amount of negative pressure while operating at a practical speed and thereby avoid unnecessary wear and tear on the pumping elements.

It is also an object of this invention to associate the compound pressure pump with the oil pump of the motor vehicle power plant in a manner to permit ready installation and repair of the same.

In the drawings—

Fig. 1 is a fragmentary illustration of a motor vehicle equipped with an accessory system embodying the present invention;

Fig. 2 is a sectional view through the compound pump and a portion of the power plant illustrating the construction of the pump and its association with the related mechanisms of the power plant;

Figs. 3, 4, 5, and 6 are transverse sectional views taken about on lines 3—3, 4—4, 5—5 and 6—6, respectively, in Fig. 2; and Fig. 7 is a fragmentary sectional view through the sealing oil passage, as viewed on line 7—7 of Fig. 6.

Referring more particularly to the drawings, numeral 1 designates the usual internal combustion engine of the motor vehicle power plant, 2 the windshield over which the wiper 3 is actuated by a suction operated motor 4. The accessory motor 4 is connected by a suction passage 5 to the compound gear pump 15 which is more clearly illustrated in the remaining figures of the drawings. The motor vehicle engine has the oil pump 6 of its lubricating system driven from the cam shaft 7 in the usual manner, and the timer shaft 8 is connected to the pump shaft 9 so as to be driven therefrom. The pump and timer shafts are disposed in transversely inclined bearings 10 and 11 with the timer and oil pump being disposed at the opposite ends of the shafts and exteriorly of the engine crank case for ready accessibility. In certain motor vehicle constructions the oil pump is disposed within the crank case 12, although that shown herein is disposed exteriorly thereof and has its oil inlet port 13 communicating with the reservoir of the chamber through a strainer 14.

For ease in mounting the compound low pressure pump, generally indicated at 15, the same is attached directly to the bottom of the oil pump, while the housing of the latter is provided with a sleeve bearing 6' fitting into the bearing 11 for supporting the pump shaft 9. The low pressure pump comprises a central driving gear 16 and two or more driven gears 17, 18, the driven gears being preferably smaller for compactness. The three gears 16, 17 and 18 enclosed in a conforming cup shaped housing 19, form a double pump which is provided with a base mounting flange 20 for mounting in substitution for the usual removable cover plate of the oil pump. The base wall of the cupped housing will therefore serve to close the lower side of the oil pump and in addition thereto, extend laterally a sufficient distance to close the increased dimension of the housing 19. The driving gear 16 is fixed on its shaft 32 which is provided with a key 21 to interlock with the lower end of the oil pump shaft 9 for effecting a driving connection common to both pumps so that when attaching the suction pump to the oil pump, it only necessary to interlock the key 21 with the lower end of the shaft 9 and then guided by a pair of positioning pins 22, align the bolt receiving holes in the mounting flange 20 with corresponding openings in the oil pump housing for receiving the attaching bolts or screws of the latter.

The open side of the cup shaped housing 19 is closed by a port plate 24 which is provided with a pair of inlet ports 25 and a pair of exhaust or outlet ports 26. The outer face of the port plate is provided with a passage 27 connecting the two inlet ports 25, and a passage 28 likewise connecting the two outlet ports 26. By reason of the compound gear arrangement, there are, in effect, two low pressure pumps provided and for this reason there are provided the two sets of inlet and outlet ports, one set for each effective pumping zone or chamber. The inlet ports 25 are positioned to communicate with the chambers at diametrically opposite points with respect to the driving gear 16 where the intermeshing teeth disengage whereby the open spaces or pockets between the teeth will draw air in through the inlet ports and carry it about the periphery to the next point of intermesh for discharge of the air content into the diametrically opposed outlet ports.

The necessary clearance between the intermeshing gear teeth and between the gear teeth and their confining casing walls are sealed by a minute quantity of oil which enters the pump chamber from the oil pump through an oil transfer port 30. This port is of restricted size and capacity but is sufficient to effectively seal the air pump for obtaining adequate air displacement during the operation of the gear pumping elements. This transfer port 30 leaves the oil pump at the pressure side thereof and preferably discharges against a side face of the driving gear at a point angularly displaced from both the inlet ports and the outlet ports of the air pump. This will spread or distribute the oil outwardly toward the teeth to lubricate and seal them before final discharge from the pump.

One of the connecting passages, in the illustrated embodiment the passage 28, is in communication with an axial passage 31 in the pump shaft. With the passage in such communication the excess oil is conducted along with the air exhaust through the connecting passage 28 and out through a communicating delivery duct 31, which may be formed axially through the shafts 9 and 32. The suction line 5 is connected to the housing 19, as at 29, where communication is had with both inlet ports 25 by the connecting passage 27. This axial passage 31 returns the oil along with the exhaust air to the crank case and for this purpose it is provided with a lateral discharge port or duct 33, within the crank case or opposite a cut away portion 34 in the removable shaft bearing or sleeve of the oil pump housing. The bottom of the cup shaped housing 19 is relieved or provided with recesses 35 adjacent the point where the teeth of the gears enter into meshing relationship, such recesses being provided to permit the ready escape of the sealing oil from between the teeth and thereby avoid noisy operation. The bearings for the driven gears may be lubricated through radial passages 36. A cover plate 37 is applied to the outer face of the port plate 15 for overlying and closing the connecting passages 27 and 28 and their ports. This simplifies the manufacture of the pump and renders the same practical in design.

While the construction has been fully described in detail, it is obvious that the inventive concept and teaching herein is applicable to other physical embodiments of the invention and, therefore, it is not the intention to restrict the scope of the patent thereby, except as the appended claims may define.

What is claimed is:

1. An air pump comprising a housing having a wall provided with a pair of inlet ports joined by an open connecting passage and a pair of outlet ports likewise joined by an open connecting passage, a cover plate seating over the open passages and removable to give access to the ports and their connecting passages; three intermeshing air displacing elements operating in the housing and operatively related to the ports, and means for supplying the gear elements with a sealing quantity of oil, the outlet ports discharging the excess sealing oil together with the exhaust air.

2. An air pump mountable and demountable as a unit and comprising a housing, a plurality of intermeshing gear pump elements journaled in the opposing walls of the housing, a drive shaft for one of the pump elements, said shaft having an axial passage therein, the outer one of said walls being provided with an outlet port, a cover plate secured to the said outer wall and removable to give access to the port, and means for supplying a sealing quantity of oil to the gear pump elements, the outlet port communicating with the axial passage for discharging the excess sealing oil together with the exhaust air through the drive shaft.

3. An air pump of the gear type mountable and demountable as a unit on the oil pump of a motor vehicle to be drivne therefrom, comprising, in combination with such oil pump, a housing and air displacing gear elements journaled therein for being driven from the oil pump, said housing having a wall between the two pumps provided with a restricted oil transfer passage opening through an enlarged passage against the side of one of the gear elements for conducting a sealing quantity of oil under pressure from the oil pump to the air pump to seal the gear elements.

4. An air pump having a housing with a wall, air displacing means journalled within the housing and having a shaft journalled in the wall and provided with a longitudinal passage opening through the wall to the outer side thereof, and a cover plate secured to the wall over the end of the shaft, the pump having a port communicating with the pump chamber, said cover plate having a wall opposing the housing wall and one of the walls being provided with a channel on the face thereof constituting a passage establishing communication between said port and the shaft passage, said cover plate being removable to give access to the passage.

ERWIN C. HORTON.